United States Patent [19]

Heraty

[11] Patent Number: 4,809,720
[45] Date of Patent: Mar. 7, 1989

[54] BRUSHLESS VEHICLE WASHING APPARATUS

[76] Inventor: Patrick T. Heraty, 12023 S. 76th Ave., Palos Heights, Ill. 60463

[21] Appl. No.: 129,478

[22] Filed: Dec. 7, 1987

[51] Int. Cl.⁴ ............................................. B08B 3/04
[52] U.S. Cl. ................................... 134/45; 134/57 R; 134/123; 134/172; 134/181; 15/DIG. 2; 239/751
[58] Field of Search ............... 134/45, 57 R, 123, 172, 134/181; 15/DIG. 2; 239/750-753

[56] References Cited

U.S. PATENT DOCUMENTS

| 1,183,391 | 5/1916 | Mason | 134/123 |
| 2,774,980 | 12/1956 | Morison et al. | 15/DIG. 2 X |
| 2,854,680 | 10/1958 | Wilson | 15/DIG. 2 X |
| 3,038,481 | 6/1962 | Brechtel | 134/57 R |
| 3,072,130 | 1/1963 | Grabenhorst | 134/123 X |
| 3,604,434 | 9/1971 | Hurst | 134/181 X |

FOREIGN PATENT DOCUMENTS 1953027  5/1970  Fed. Rep. of Germany ...... 134/123

Primary Examiner—Timothy F. Simone
Assistant Examiner—Stephen F. Gerrity

[57] ABSTRACT

A brushless vehicle washing apparatus and process which cleans all four sides and top of any sized vehicle uniformly and in an efficient manner, without touching such vehicle.

13 Claims, 1 Drawing Sheet

BRUSHLESS VEHICLE WASHING APPARATUS

BACKGROUND OF THE INVENTION

This invention relates to apparatuses for washing vehicles, and more particularly to brushless vehicle washing apparati.

Over the years a number of car washing devices have been suggested. Typifying these prior art devices are those found in U.S. Pat. Nos. 2,699,792, 3,299,901, 3,422,827, 3,529,611 and 3,844,480. These prior art car washing devices have met with varying degrees of success.

With the high cost of new automobiles these days, owners now prefer brushless car washes that do not touch or scratch their automobiles, and preserve the finish. Such an apparatus includes nozzle assemblies which, for example, comprise a plurality of circumferentially spaced nozzles. The nozzle assemblies are rotatable by the force of liquid under pressure sprayed through the nozzles. The nozzles are carried by a carriage which moves along a track assembly which is secured to a building structure or other overhead support. An automobile to be washed is driven into a bay defined by a track assembly. When the automobile is properly positioned, the carriage is driven along the track, relative to the automobile. Wash and rinse liquids under pressure are supplied to the nozzle assembly through the use of a swivel union and flexible conduit.

The prior art car washing apparatuses have stationary rails, that do not adequately wash automobiles. Compact cars, sub-compact cars, mini-vans, and other non-standard sized automobiles are not adequately washed because the stationary rails are designed only for one standard sized automobile. Accordingly, in the case of non-standard or odd sized automobiles, the rear and passenger side are not adequately cleaned because the rear portion and passenger side of the automobile are located farther away from the water spraying devices and scrubbers than the front and drivers side of the automobile, thus the rear and passenger side are adequately washed. Moreover, the prior art automobile washing apparatuses require only one dispensing device and specific swivel unions and flexible conduits are required for supplying cleaning and rinsing liquids, and power to the nozzle assembly. Such swivel unions frequently leak, freeze up, or break down prematurely, thereby causing enormous maintenance costs.

It is, therefore, desirable to provide an improved vehicle washing apparatus and process which overcomes most, if not all, of the above problems.

SUMMARY OF THE INVENTION

It is an object of the present invention to provide a new and improved vehicle washing apparatus and process.

Another object of the invention is to provide an improved vehicle washing apparatus which cleans all four sides of any sized automobile in a better more uniform and more efficient manner than other known vehicle washing devices.

Another object of the invention is to provide a brushless automatic vehicle washing apparatus that operates totally unattended, fits into existing self service bays, operates reliably day after day in the harsh environment in which vehicle washing equipment is expected to perform in, and can be operated profitably.

A further object of the invention is to provide an improved vehicle washing apparatus including an adjustable frame which locates water dispensing devices of the apparatus in close proximity to all surfaces of the vehicle to be cleaned.

These and other objects are achieved by the present invention which has provided a car washing apparatus.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating an understanding of the present invention, there is illustrated in the accompanying drawings a preferred embodiment thereof, from an inspection of which, when considered in connection with the following description, the invention, its construction and operation, many of its advantages will be readily understood and appreciated.

DESCRIPTION OF THE PREFERRED EMBODIMENT

Figure 1:
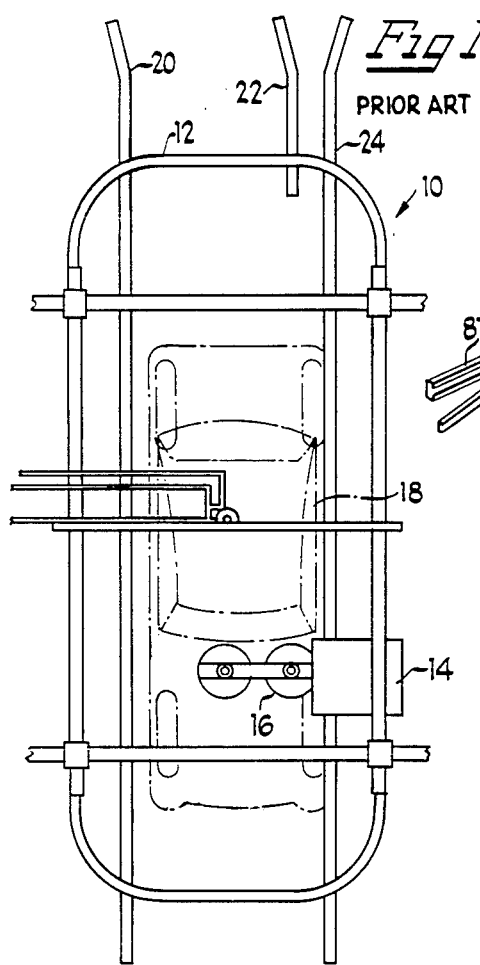
FIG. 1, which is labeled prior art, is a fragmentary top plan view of a known car washing apparatus.

Referring to FIG. 1, there is illustrated a prior art vehicle washing apparatus 10 which includes a stationary frame 12 which is supported on a building structure or other overhead support (not shown), a carriage 14, and a pair of nozzles 16. The frame 12 is oval shaped and includes a depending track (not shown) in which the carriage 14 rides. The nozzles 16 extend inwardly of the frame 12 from the carriage 14.

A vehicle to be washed, shown in dashed line in FIG. 1 at 18, is driven to a predetermined position below and within the frame 12, and is guided to such position by means of guide rail 20, 22, and 24 which are engageable by the wheels of the vehicle 18. When the vehicle 18 is in place, the carriage 14 is driven along the frame 12, around vehicle 18. As the carriage 14 travels along the frame 12, the nozzles 16 are moved for example from the forward portion of the vehicle 18 to the back portion, and then toward the forward portion of the vehicle. As the nozzles 16 are moved relative to the vehicle, the nozzles spray liquid under pressure towards the vehicle. It is apparent that because the frame 12 is fixed, the relative spacing between the vehicle and the nozzle is fixed. Thus, for non-standard sized vehicles such as compact cars, sub-compact cars, mini-vans, etc., there will be a greater separation between the nozzles and the vehicle on the passenger side and rear of the vehicle, than for the separation between the nozzles and the vehicle on the drivers side and front of the vehicle, resulting in uneven and inadequate cleaning of the vehicle.

Figure 2:
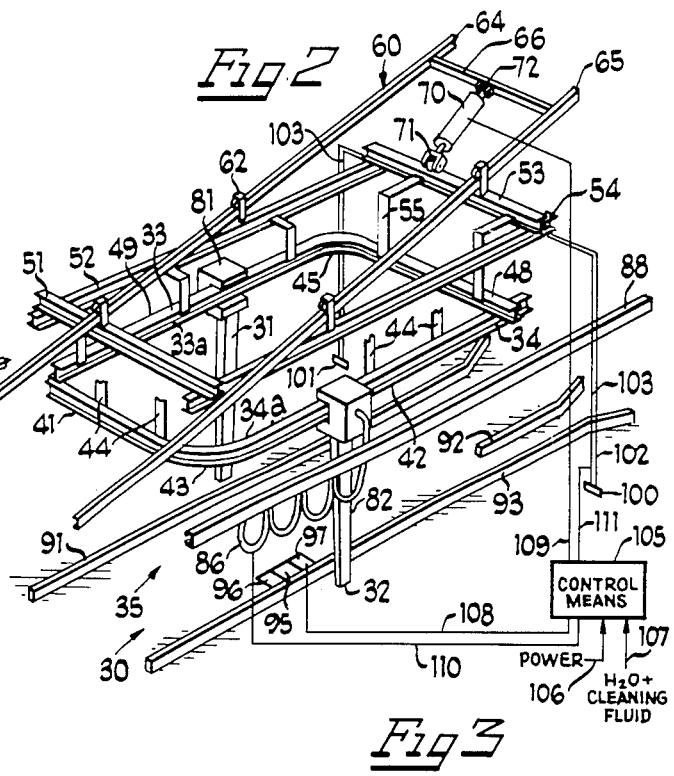
FIG. 2 is a perspective view of a car washing apparatus provided by the present invention.
Figure 3:
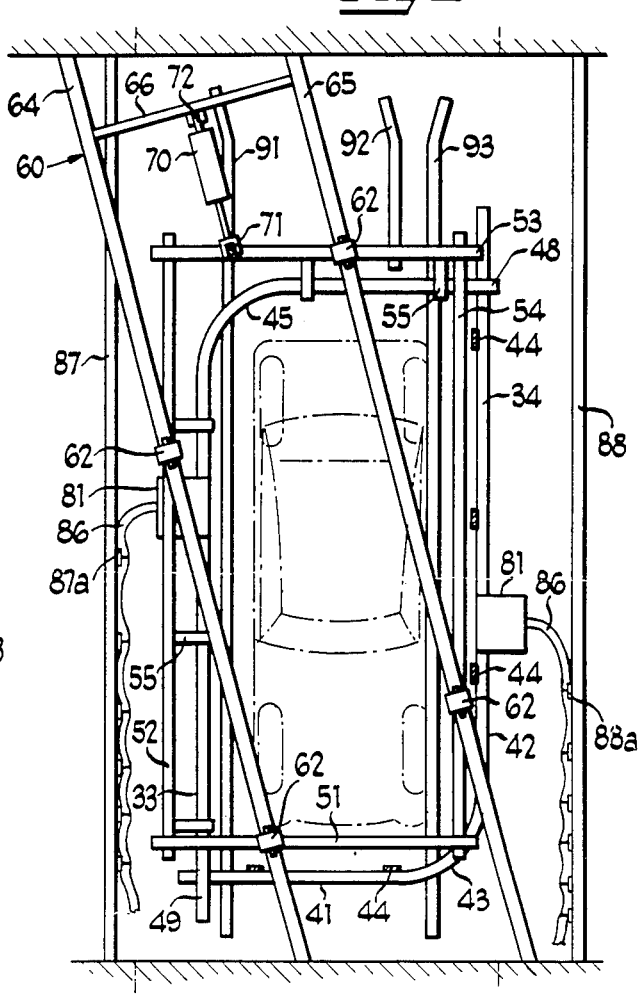
FIG. 3 is a top plan view of the car wash apparatus provided by the present invention.
Figure 4:
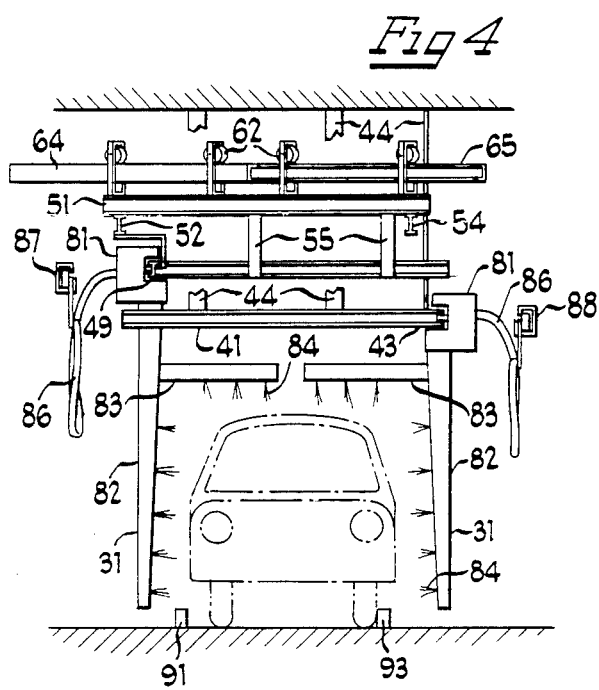
FIG. 4 is a front elevation view of the car wash apparatus provided by the present invention.

Referring to FIGS. 2–4, the brushless vehicle washing apparatus 30 is provided. It includes first and second fluid dispensing devices, 31 and 32, respectively, which are mounted for movement along a moveable and a stationary track section, 33 and 34, respectively, with the moveable track section 33 being moveable relative to the stationary track section 34. Both moveable track section 33 and stationary track section 34 are generally L-shaped. As will be shown, this arrangement enables adjustment of the relative size of the "bay area" 35 defined by the track sections 33 and 34 and within which a vehicle to be washed will be contained during the washing operation.

The stationary track section 34 includes a forward portion 41, a side or longitudinal portion 42, and angular portion 43. The longitudinal portion 42 is parallel to the longitudinal axis of the vehicle washing apparatus 30 and is formed intricately with and extends at a right angle to the forward portion 41. The stationary track 33 is suspended from and supported by a building structure or other overhead support (not shown) by way of a plurality of brackets 44, portions of which are shown projecting upwardly from the inner side 34a of the stationary track section 34, so as not to interfere with the movement of the second fluid dispensing device 32 movement along stationary track section 34.

The moveable track 33 includes a rear or lateral portion 48, a longitudinal portion 49, and angular portion 45. The longitudinal portion 49 is parallel to the longitudinal axis of the vehicle washing apparatus 30, and parallel to the longitudinal portion 42 of stationary track section 34. The rear portion 48 is at a right angle to longitudinal portion 49. The moveable track section 33 is suspended from a rectangular support frame 50 formed by four members, a front member 51, a passenger side member 52, a rear member 53, and a drivers side member 54. The moveable track 33 is secured to and depends from the frame 50 by brackets 55. The brackets 55, project upwardly from the inner side 33a of the moveable track 33, so as not to interfere with the movement of the first fluid dispensing device's 31, movement and travel along moveable track section 33. The rectangular frame 50 in turn is suspended from a fixed support or inverted U-shaped support frame 60 by way of roller assemblies 62 and rollers 63. The frame 60 includes three elements including first angled element 64 and second angled element 65 both of which extend in a parallel spaced relationship to each other, and are interconnected at the rearward end thereof by a cross member 66. The inverted U-shaped frame 60 is secured to a building structure or other overhead support (not shown). The support frame 60 is positioned at an angle relative to the longitudinal axis of the bay area 35, defined by the vehicle washing apparatus 30. The first and second angled elements, 64 and 65, of support frame 60, extend at an angle ranging from about 5° to 85° relative to the longitudinal axis of the "bay area." For best results, the support frame is positioned at an angle of from 30° to 60° relative to the longitudinal axis. The cross member 66 is coupled to the rear member 53 of the rectangular support frame 50 by way of a drive mechanism 70, such as an electric screw auger, having its butt-end 71 secured to the upper surface of rear member 53 and its rod-end 72 connected to the inner forward surface of cross member 66. The drive mechanism 70 may be a hydraulic cylinder, pneumatic cylinders, etc.

Supported on the moveable and stationary tracks 33 and 34, respectively, are the first and second fluid dispensing devices 31 and 32, respectively. The first and second fluid dispensing devices 31 and 32, each include a head portion 81, a vertical pipe section 82, and a horizontal pipe section 83. The vertical and horizontal pipe sections 82 and 83 have a plurality of inwardly facing nozzles directed at the vehicle to be washed. Cleaning fluids under pressure and power are supplied to the head portion 81 by suitable or flexible conduits 86. The conduits 86 are supported on passenger-side side rail 87 and drivers-side side rail 88 extending along an inner wall or inner support member (not shown), attached to and associated with the building or support structure. The conduits 86 also supply power for driving the electrical motors in each of the head portions 81 of the first and second fluid dispensing devices 31 and 32 which drive the first and second fluid dispensing devices along moveable and stationary track sections 33 and 34, respectively.

The vehicle washing apparatus 30 further includes guide rails 91, 92 and 93 for guiding a vehicle into place, parallel to the longitudinal axis of the brushless vehicle washing apparatus 30.

The brushless vehicle washing apparatus 30 is adapted for operation between an open position, illustrated in FIG. 2 and a closed position, illustrated in FIG. 3. In the open position, the drive mechanism, screw auger, pneumatic, or hydraulic cylinder 70, is retracted such that the moveable track 33 is moved away from the stationary track 34, defining a maximum opening of the "bay area" for the vehicle washing apparatus 30, to allow a vehicle to be washed to drive into the "bay area."

Once a vehicle has been driven to the "bay area", an operator or driver can manually, electronically or automatically actuate the vehicle washing apparatus to cycle on. In the preferred embodiment, the front drivers-side tire of the vehicle to be washed, actuates a mechanical pad or electrical switch 95. The switch 95 is positioned on the floor of the bay area and has a front portion 96 and rear portion 97 protruding above the floor to allow the front drivers-side tire to be snugly positioned therebetween to keep the vehicle substantially stationary while it is being washed and also allows the car to be driven away easily thereafter. Similarly, other embodiments to actuate the apparatus 30 on, can be utilized, such as photo sensory devices or mechanical, electrical or electronic switching mechanisms which are actuated by placing a token or coin in a receptacle. After the vehicle washing apparatus 30 has been actuated to cycle on, the drive mechanism 70 is actuated causing the frame 50 to move forward along the stationary inverted U-shaped support frame 60. The frame 50 travels inwardly with moveable track section 33, at an angle relative to the longitudinal axis, toward the stationary track section 34. Sensing means 100 transmits a light source to the photo receiving sensing means 101. Sensing means 100 and 101 are carried by and attached to rear member 53 of support 50 by conduits 102 and 103. The sensing means 100 and 101 sense and locate the rear of the vehicle, by breaking the light source from sensing means 100 to 101. Once the light source is broken, the drive mechanism 70 is de-energized, thus stopping or halting the movement of the frame 50 with moveable track section 33. Thus, the moveable track 33 has been moved forwardly and inwardly in a direction substantially parallel to angled elements 64 and 65, or into the desired position relative to and in proximity of the rear and passenger side of the vehicle to be washed. The angle of the angled elements 64 and 65 of support frame 60 enable the moveable track 33 to be positioned above in proximity to, and at a predetermined distance from the drivers side and rear of the vehicle to be washed.

Once the light source transmitted from sensing means 100 to 101 is interrupted and drive mechanism 70 is deactivated, both first and second fluid dispensing devices 31 and 32 are electrically energized and cleaning fluid is passed thereto, through conduits 86. The power energizes the motor in the head portion 81 of first and second fluid dispensing devices 31 and 32, allowing both fluid dispensing devices to travel along moveable and stationary track sections 33 and 34, respectively. Concurrently, cleaning fluid is dispensed under pressure at the top and outer surfaces of the automobile through a plurality of inwardly facing nozzles 84 of the horizontal and vertical pipe section 83 and 82, of the first and second fluid dispensing devices 31 and 32, respectively. Thus, any sized automobile will be cleaned uniformly on all four sides and on top because there will be a uniform spacing which is at a minimum distance such as less than 3 feet, between the nozzles 84 and the top and outer surfaces of the vehicle.

After a predetermined amount of time has elapsed, the power and cleaning fluid is shut off in the head portion 81 of the first and second fluid dispensing devices 31 and 32. The first and second fluid dispensing devices 31 and 32, come to rest at the longitudinal portions 49 and 42, respectively. The drive mechanism 70 then is energized to the retracted position (FIG. 2), to allow the vehicle just washed to leave unhindered, and further allow another vehicle to enter the bay area 35.

In use, the vehicle to be washed is driven into place in the vehicle washing bay area 35. The vehicle washing apparatus 30 is cycled "on" by the front-drivers side tire of the vehicle to be washed contacting and depressing a switchplate 95 on the floor of the bay area 35. The automobile is guided into place by the tires being guided between rails 91, 92 and 93. As soon as the plate 95 is actuated, the support frame 50 is driven diagonally inwardly by driving mechanism 70. This also moves the first fluid dispensing device 31 inwardly and in proximity to the passenger side of the vehicle. A sensing means, photo-sensor or electric eye 100 and 101 are attached to and extend down from the rear member 53 of frame 50. When the sensing means beam or light is broken or discontinued, from 100 to 101, the sensing means 100 and 101 discontinues, switches off, and de-energizes the power to drive mechanism 70, which stops the process of closing frame 50. Thereafter, the first and second fluid dispensing means 31 and 32, are cycled "on" for a predetermined time. The first and second fluid dispensing devices 31 and 32 both follow a generally L-shaped path along the moveable and stationary track sections 33 and 34, respectively along the outer surfaces and top of the vehicle to be washed. Cleaning fluid, soap, and water, and mixtures thereof, are directed inwardly and downwardly at a high pressure from the first and second fluid dispensing devices 31 and 32 through nozzles 84, while the fluid dispensing means are reciprocatingly transported around the vehicle by the motors in head portions 81. The first and second fluid dispensing devices 31 and 32 pull or tug conduits 86, which are supported, connected to, and draped from rollers and roller assemblies 87a and 88a, along passenger-side side rail 87 and drivers-side side rail 88, respectively, to provide unhindered and uninterrupted freedom of movement for the fluid dispensing means. Thereafter, the driving means 70 retracts or pulls rectangular frame 50 to the open position thereby moving the first fluid dispensing device 31, which comes to rest and is positioned in proximity to the passenger side door of the vehicle, to the open position. This allows the vehicle to exit the bay area.

A control device or control means 105 electrically or electronically controls the sequence of events in the brushless vehicle washing apparatus 30 and process. The control means 105 has two inputs, a power input 106 and a water and cleaning fluid input 107. The control means 105 is connected to the actuating device or switch 95 by wires, conduit or lead 108, which starts the apparatus 30 and process to close the support frame 50. Closing is accomplished by control means 105 sending a signal to energize drive mechanism 70 through lead, wire or conduit 109. When the sensing means beam or light 100 and 101 is broken, a signal is sent through lead, wire, or conduit 111 to control means 105 to stop closing frame 50 by de-energizing drive mechanism 70 by a signal through lead 109. Immediately thereafter, a signal is sent to both first and second fluid dispensing devices 31 and 32 through lead, wire or conduit 110 to energize both devices 31 and 32 for a predetermined duration of time by utilizing a timing device in the control device 105. Simultaneously, water and cleaning fluid is fed through 110, to both devices 31 and 32 to dispense cleaning fluid to the outside surfaces and top of the vehicle to be washed through nozzles 84, while such devices 31 and 32 reciprocatingly travel along moveable track section 33 and stationary track section 34, respectively. After the vehicle has been washed and rinsed, the control means 105 sends a signal through lead 109 to drive mechanism 70 to open the rectangular support frame 50 and thereby allow the vehicle to exit the bay area 30 and further allow another vehicle to be driven into the bay area to start the process all over again.

Although embodiments of this invention have been shown and described, it is to be understood that various modifications and substitutions, as well as rearrangements and combinations of process steps and equipment, can be made by those skilled in the art without departing from the novel spirit and scope of this invention.

I claim:

1. In a brushless vehicle washing apparatus, the combination comprising:

a generally L-shaped fixed track;

a generally L-shaped moveable track, said fixed track and said moveable track each having an inner side and an outer side, and said fixed track and said moveable track defining a generally rectangular bay area for washing vehicles;

means supporting said moveable track in opposing relation with said fixed track, said support means including a generally rectangular support frame and a guide track means extending at a diagonal relative to said support frame to enable said moveable track which is carried by said support frame, to be moved diagonally toward and away from said fixed track to vary the spacing between said fixed track and said moveable track;

fluid dispensing means coupled to each of said fixed and moveable tracks and moveable there along;

drive means coupled to said support frame for moving said support frame between an open and a closed position; and control means coupled to said drive means for limiting the movement of said moveable track relative to said fixed track.

2. The brushless vehicle washing apparatus described in claim 1 wherein said guide track means extends at a diagonal relative to said support frame at an angle ranging from about 10° to 80° relative to said support frame.

3. The brushless vehicle washing apparatus described in claim 1 wherein said guide track means includes two stationary tracks fixedly supported in a parallel relationship and a lateral cross member extending therebetween.

4. The brushless vehicle washing apparatus described in claim 1 wherein:
   said fluid dispensing means includes an electric motor; and
   rollers engageable with each of said movable and fixed tracks and drivingly connected to said motor for driving said fluid dispensing means reciprocatingly along a predetermined path along each of said moveable and fixed tracks.

5. The brushless vehicle washing apparatus described in claim 1 wherein said fluid dispensing means includes a plurality of inwardly directed nozzles aimed at the vehicle to be washed.

6. The brushless vehicle washing apparatus described in claim 1 wherein said nozzles direct cleaning fluid to the vehicle to be washed at a distance of less than 3 feet.

7. The brushless vehicle washing apparatus described in claim 1 wherein said fluid dispensing means includes a flexible conduit attached thereto for feeding power and cleaning fluid thereto.

8. The brushless vehicle washing apparatus described in claim 7 further comprising:
   a pair of stationary side rails in a parallel relationship for supporting said conduits and maintaining a steady fluid and power feed to said fluid dispensing means; and
   a plurality of rollers and roller assemblies, said rollers engageable with said side rails and said roller assemblies supporting said conduits for draping said conduits away from said fluid dispensing means and further providing freedom of movement for said fluid dispensing means.

9. The brushless vehicle washing apparatus described in claim 1 wherein said control means includes an actuating device, a sensing device and a timing device, said actuating device is positioned on the floor of said bay area in proximity to the front-drivers side tire of said vehicle to be washed for energizing said drive means to close said support frame, said sensing device is attached to and extends down from said support frame to a distance in proximity to the rear portion of said vehicle to be washed for sensing the size of said vehicle by de-energizing said drive means to stop closing said support frame and thereby stopping the inward movement and adjustment of said moveable track, and said timing device energizing said fluid dispensing means for allowing said fluid dispensing means to travel reciprocatingly along a predetermined generally L-shaped path for a predetermined time and thereafter energizing said drive means to open said support frame for allowing said vehicle to exit said bay area.

10. In a brushless vehicle washing apparatus, the combination comprising:
   a substantially L-shaped fixed track;
   a substantially L-shaped moveable track, said fixed track and said moveable track each having an inner side and an outer side, and said fixed track and said moveable track defining a substantially rectangular bay area for washing vehicles;
   means supporting said moveable track in opposing relation with said fixed track, said support means including a substantially rectangular frame and a guide track means extending at a diagonal relative to said support frame to enable said moveable track which is carried by said support frame to be moved diagonally toward and away from said fixed track to vary the spacing between said fixed track and said moveable track;
   a first fluid dispensing means movably mounted to and carried by said moveable track and a second fluid dispensing means movably mounted to and carried by said fixed track for directing fluid to the vehicle to be washed in said bay area;
   drive means coupled to said support frame for moving said support frame between an open and a closed position; and
   control means coupled to said drive means for limiting the movement of said moveable track relative to said fixed track.

11. The brushless vehicle washing apparatus described in claim 10 wherein said rectangular support frame of said support means includes:
   a front member, a passenger side member, a rear member, and a drivers side member, each of said members attached to each successive member comprising a generally rectangular configuration;
   a plurality of generally L-shaped brackets extending inwardly and downwardly from said passenger side member and said rear member for connecting and supporting said inner side of said moveable track to said support frame for allowing said fluid dispensing means to freely travel along said moveable track; and
   a plurality of roller assemblies and rollers extending upwardly from said members engageable with and movably coupled to said guide track means for allowing movement of said support frame along said guide track.

12. The brushless vehicle washing apparatus described in claim 11 wherein said guide track means includes two substantially stationary tracks fixedly supported in a substantially parallel relationship and a lateral cross member extending between each of said stationary tracks.

13. The brushless vehicle washing apparatus described in claim 12 wherein said drive means is coupled to and between said rear member of said support frame and said lateral cross member of said guide track means.

* * * * *